United States Patent
Date et al.

(10) Patent No.: US 10,364,811 B2
(45) Date of Patent: Jul. 30, 2019

(54) DOMESTIC APPLIANCE COMPRISING AN ACTUATOR

(75) Inventors: Milind Vishwas Date, Singapore (SG); Kam Weng Choy, Singapore (SG); Johannes Willem Tack, Zuidhom (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 150 days.

(21) Appl. No.: 14/233,313

(22) PCT Filed: Jul. 19, 2012

(86) PCT No.: PCT/IB2012/053675
§ 371 (c)(1),
(2), (4) Date: Jan. 16, 2014

(87) PCT Pub. No.: WO2013/011473
PCT Pub. Date: Jan. 24, 2013

(65) Prior Publication Data
US 2014/0157956 A1    Jun. 12, 2014

Related U.S. Application Data

(60) Provisional application No. 61/509,157, filed on Jul. 19, 2011.

(51) Int. Cl.
*F04B 23/02* (2006.01)
*F04B 39/12* (2006.01)
(Continued)

(52) U.S. Cl.
CPC ............ *F04B 53/003* (2013.01); *A47J 31/00* (2013.01); *D06F 75/12* (2013.01); *D06F 75/40* (2013.01);
(Continued)

(58) Field of Classification Search
CPC ........ F04B 53/16; F04B 23/02; F04B 53/003; F04B 53/001; F04B 53/22; F04B 39/12; F04B 39/121; F04B 39/127; F04B 39/123
See application file for complete search history.

(56) References Cited

U.S. PATENT DOCUMENTS 2,018,180 A * 10/1935 Lawton .................... H02K 5/24
                                                        248/619
4,891,955 A    1/1990  Klausing et al.
(Continued)

FOREIGN PATENT DOCUMENTS

EP        0135484 B1    12/1988
EP        0682142 A2    11/1995
(Continued)

*Primary Examiner* — Bryan M Lettman

(57) ABSTRACT

A domestic appliance, such as a steam iron or a coffee making apparatus. The appliance comprises a housing, a water reservoir, an actuator, and a boiler for providing hot water or steam for an appliance. An input of the actuator is connected to the water reservoir, an output of the actuator is connected to an inlet of the boiler. In operation, the actuator introduces vibrations which are transmitted to the housing and radiated by the housing to the environment which cause unwanted sounds and noise. The unwanted sounds and noise induced by these vibrations is substantially reduced via two leaf springs mounted at opposite sides of the actuator which reduce the transmission of the vibrating energy by moving the actuator in a direction opposite to a direction of the movement of the drive member.

7 Claims, 2 Drawing Sheets

(51) Int. Cl.
*F04B 53/00* (2006.01)
*F04B 53/16* (2006.01)
*F04B 53/22* (2006.01)
*A47J 31/00* (2006.01)
*D06F 75/12* (2006.01)
*F22B 1/28* (2006.01)
*D06F 75/40* (2006.01)
*F16H 21/44* (2006.01)

(52) U.S. Cl.
CPC ............ *F04B 23/02* (2013.01); *F04B 39/121* (2013.01); *F04B 53/16* (2013.01); *F04B 53/22* (2013.01); *F16H 21/44* (2013.01); *F22B 1/285* (2013.01); *F04B 39/123* (2013.01); *Y10T 74/18888* (2015.01)

(56) References Cited

U.S. PATENT DOCUMENTS

| | | | | |
|---|---|---|---|---|
| 5,134,924 | A * | 8/1992 | Vicker | A47J 31/3633 99/280 |
| 5,452,993 | A * | 9/1995 | Lanigan | F04B 43/02 417/413.1 |
| 5,649,812 | A * | 7/1997 | Schoenmeyr | F04B 43/0054 248/628 |
| 6,565,332 | B2 * | 5/2003 | Kawahara | F04B 35/045 417/363 |
| 7,805,867 | B2 | 10/2010 | Har | |
| 2007/0020122 | A1 * | 1/2007 | Halkyard | F04B 35/045 417/363 |
| 2007/0157821 | A1 * | 7/2007 | Panesar | A47J 31/0673 99/279 |
| 2010/0107887 | A1 * | 5/2010 | Bentley | A47J 31/44 99/288 |
| 2010/0172769 | A1 * | 7/2010 | Lilie | F04B 35/045 417/363 |
| 2012/0098253 | A1 * | 4/2012 | Folcarelli | B29C 45/14614 285/240 |

FOREIGN PATENT DOCUMENTS

| | | | |
|---|---|---|---|
| EP | 0731205 | A1 | 9/1996 |
| JP | 5891038 | U | 6/1983 |
| JP | 60225532 | A | 11/1985 |
| JP | 02245541 | A | 10/1990 |
| JP | 0482440 | U | 7/1992 |
| JP | H0482440 | * | 7/1992 |
| JP | 2006081804 | A | 3/2006 |
| KR | 2004088656 | A | 10/2004 |

* cited by examiner

DOMESTIC APPLIANCE COMPRISING AN ACTUATOR

CROSS-REFERENCE TO PRIOR APPLICATIONS

This application is the U.S. National Phase application under 35 U.S.C. § 371 of International Application No. PCT/IB2012/053675, filed on Jul. 19, 2012, which claims the benefit of U.S. Provisional Patent Application No. 61/509,157 filed Jul. 19, 2011. These applications are hereby incorporated by reference herein.

FIELD OF THE INVENTION

The invention relates to a domestic appliance comprising a base frame and an actuator connected to the base frame.

BACKGROUND

Domestic appliances such as a coffee making machine or a steam iron for garment care are used by a user to facilitate tasks.

EP-0135484 discloses a steam iron comprising a sole plate, a water reservoir and a boiler wherein the plunger pump is arranged to pump water from the reservoir to a steam generator.

In operation, for example when a user applies steam to the garment, the actuator, i.e. the plunger pump reciprocally moves the plunger to pump water from the water reservoir to the boiler, which in turn delivers steam to the garment.

The operating plunger pump generates sound and vibration which can be annoying to a user of the domestic appliance and to people present in the environment of the user, and is not user friendly.

SUMMARY OF THE INVENTION

It is therefore an object of the invention to provide a domestic appliance that, in operation, has a reduced level of sound and vibration.

According to the invention this and other objects are achieved by a domestic appliance comprising a base frame, an actuator connected to the base frame, the actuator being provided with a drive member, the actuator being arranged for reciprocating movement of the drive member at a reciprocating frequency, wherein the domestic appliance further comprises two leaf springs mounted at opposite sides of the actuator for connecting the actuator to the base frame and enabling the actuator to move in a direction opposite to a direction of the movement of the drive member. The actuator can be for example a plunger pump or a diaphragm pump.

In general, noise originating from the domestic appliance can be deduced to air born noise and structure born noise. By reducing the transmission of the vibrating energy induced by the actuator to the base frame of the domestic appliance, the structure born noise can be substantially reduced, resulting in a lower sound level of the domestic appliance.

The force transmission from the vibrations from the reciprocating actuator via the leaf springs to the frame can be modeled by a mass spring system with one degree of freedom with a natural frequency fn determined by $fn=(1/2\pi)*\sqrt{(k/m)}$ wherein:

k represents the stiffness of the leaf springs and m represents the total mass of the actuator and the drive member thereon.

This natural frequency fn of the mass spring system can be dimensioned at a frequency below the reciprocating frequency fr of the actuator by adapting the stiffness of the leaf springs. For an effective reduction of the transmission of forces from the actuator to the base frame the ratio between the reciprocating frequency and the natural frequency fr/fn should be at least √2 and damping should be minimal.

In this arrangement the vibration energy of the actuator is stored as energy in a mass spring system consisting of the actuator, the drive member and the leaf springs, so that the transmission of these vibrations to the base frame is reduced, resulting in a lower sound level of the domestic appliance.

The cited documents EP-0135484 discloses a steam iron wherein the piston pump is supported by two spaced rubber flanges to reduce the sound level of the reciprocating piston pump. In the steam iron disclosed in that document the rubber flanges are designed for substantially absorbing the vibrating energy of the actuator, however the vibrations is still partly transmitted to the base frame. That document does not disclose two leaf springs connected to opposite ends of the actuator.

In a further embodiment of the domestic appliance the leaf springs comprise a bended end portion. Bended end portions of the leaf springs provide a compact arrangement of the actuator and leaf springs.

In a further embodiment of the domestic appliance the end portions (29) of the leaf springs (21,23) that are connected to the actuator (5) conform a U-shape.

In a further embodiment of the domestic appliance the actuator is connected to the leaf-springs via elastomer members. These elastomer members can be for example rubber rings.

In a still further embodiment of the domestic appliance, the domestic appliance further comprises a water reservoir provided at the base frame, the water reservoir being operationally connected to the actuator via a first flexible tube.

In a further embodiment of the domestic appliance the water reservoir is detachably mounted at the base frame. This arrangement facilitates easy refilling of the water reservoir.

In a further embodiment the first flexible tube comprises a corrugated tube. A corrugated tube has a high flexibility and reduces transmission of vibrations from the actuator to the base frame via the corrugated tube.

In a still further embodiment of the domestic appliance, the domestic appliance further comprises a boiler for water heating or steam generation mounted at the frame and operationally connected to the actuator via a second flexible tube.

In a still further embodiment of the domestic appliance, the actuator comprises a plunger pump or diaphragm pump.

In further embodiment of the domestic appliance the actuator comprises a plunger pump, and the drive member comprises the plunger.

These and other features and effects of the present invention will be explained in more detail below with reference to drawings in which preferred and illustrative embodiments of the invention are shown. The person skilled in the art will realize that other alternatives and equivalent embodiments of the invention can be conceived and reduced to practice without departing from the scope of the present invention.

DETAILED DESCRIPTION OF EMBODIMENTS

In the figures like numerals refer to similar components.

Figure 1:
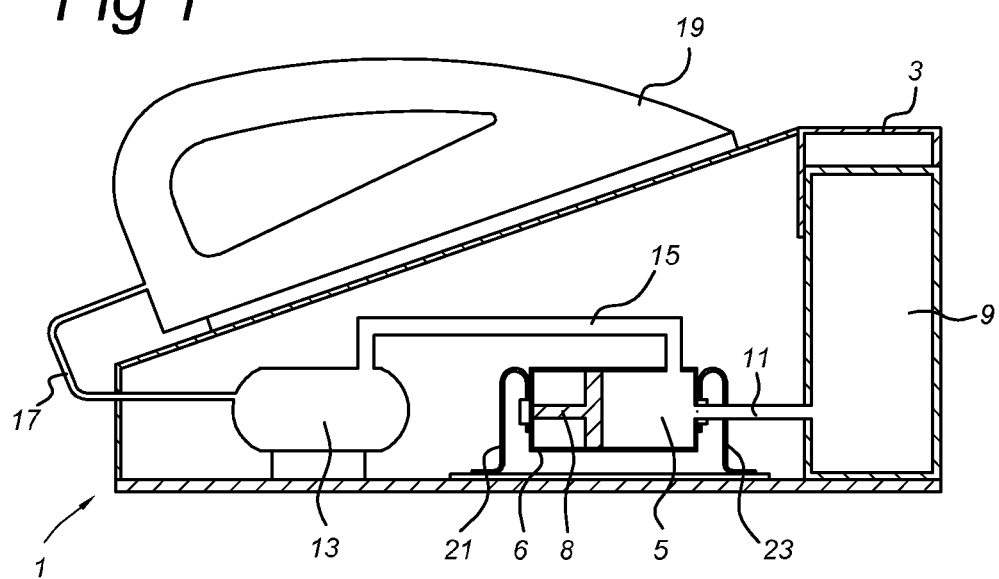
FIG. 1 shows a schematic illustration of a steam iron according to a first embodiment.

FIG. 1 shows a steam iron 1 comprising a base frame, for example an housing 3, an actuator, for example, a plunger pump 5 connected to the housing 3 via leave springs 21,23. The steam iron 1 may be provided with a water reservoir 9 mounted at the housing 3. An outlet of the water reservoir 9 is connected to an inlet of the plunger pump 5 via a first flexible tube 11. The first flexible tube 11 may be a corrugated tube. The water reservoir 9 may be detachably connected to the housing for enabling refilling with water by removing the water reservoir 9 from the housing 3, filling the water reservoir 9 and attaching the water reservoir with the housing. Furthermore, the steam iron 1 comprises a boiler 13 for heating water or generating of steam. An inlet of the boiler 13 is connected to an outlet of the plunger pump 5 via a second flexible tube 15. An outlet of the boiler 13 is connected to the iron 19 via a third flexible tube 17 for dispensing steam. The plunger pump 5 may comprise an elongated pump house 6 and a plunger 8. In this embodiment the elongated pump house 6 is connected to the housing 3 via the two leaf springs 21,23 mounted in a longitudinal direction at opposite sides of the elongated pump house 6. The leaf springs 21,23 enables the pump house 6 to move in a horizontal direction opposite to a direction of movement of the plunger 8 and parallel to the longitudinal axis of the pump house 6.

In operation, the plunger 8 is usually reciprocating at the mains frequency which can be, for example, 50 or 60 Hz. The reciprocating plunger 8 causes reaction forces of the pump house 6 to act on the leaf springs 21,23 and deflect the leaf springs in a longitudinal direction opposite to the movement of the plunger 8. The deflected leaf springs 21,23 stores kinetic energy of the vibrations as potential energy, which is released as the plunger 8 moves in an opposite direction. The leaf springs 21,23 isolate the plunger pump 5 from the housing 3 and the transmission of vibrations from the plunger pump 5 to the housing 3 is substantially reduced.

The transmission of vibrations of the reciprocating plunger pump 5 via the leaf springs 21,23 can be modeled by a mass spring system with one degree of freedom with a natural frequency fn determined by $fn = (1/2\pi) * \sqrt{(k/m)}$ wherein:

k represents the stiffness of the leaf springs 21,23 and
m represents the total mass of the plunger pump 5 and the plunger 8.

This natural frequency fn of the mass spring system can be dimensioned at a frequency substantially below the reciprocating frequency fr of the plunger 8 by adapting the stiffness of the leaf springs 21,23 and the total mass of the plunger pump 5. For a reduction of the transmission of vibrations from the plunger pump 5 to the housing 3 the ratio fr/fn between the reciprocating frequency fr and the natural frequency fn should be at least √2. For example, in case the ration fr/fn equals 10 and the reciprocating frequency fr of the plunger pump is 50 Hz, the natural frequency fn of the mass spring system should be dimensioned at 5 Hz. The actual dimensions of the leaf springs 21,23 depends on the mass of the plunger pump 5, the reciprocating frequency, and the Young's modulus of the material of the leaf springs 21,23 and the maximal allowed amplitude of the movement of the plunger pump 5 in the housing 3. In this embodiment vibrating energy is stored in the moving pump house 6 and the leaf springs 21,23. The internal damping of the leaf springs 21,23 restricts the maximum amplitude of the horizontal movement the pump house 6. The leaf springs 21,23 can be made of corrosion free spring steel. The noise reduction that can be obtaining in this arrangement is about −40 dB(A) in the direction of the movement. In practice this maximal reduction also depends on the product architecture.

Figure 2:
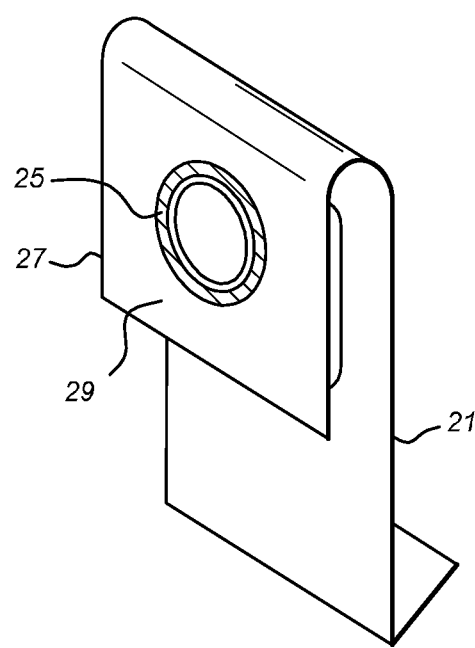
FIG. 2 shows a schematic illustration of a leaf spring.

FIG. 2 shows a schematic illustration of one the leaf springs 21. The leaf springs 21,23 can be mounted at the opposite sides of the housing 6 of the plunger pump 5 via elastomer members, for example rubber rings 25,27 at both sides of an end portion 29 of the respective leaf springs 21,23 for further damping of vibrations. The elastomer rings 25,27 may be made of synthetic material like Ethylene Propylene Diene Monomer (EPDM) or Nitrile Polymer Rubber (NPR) of mid-range hardness (50-50 Sh-A). The leaf springs 21, 23 are mounted at the opposite sides of the housing 6 of the plunger pump 5 at an attachment surface that is coextensive with the elastomer rings 25, 27.

The leaf springs 21,23 may comprise bended end portions 29 which are connected to the housing 6 of the plunger pump 5. For example, the end portions 29 of the leaf spring 21 may conform to a U-shape in order to obtain a compact configuration of the plunger pump 5 and leaf springs 21,23. Instead of a U-shape, the end portions 29 may conform to a V-shape or Z-shape. The bended end portions 29 of the leaf springs comprise a first and second leg of the U-shape.

Figure 3:
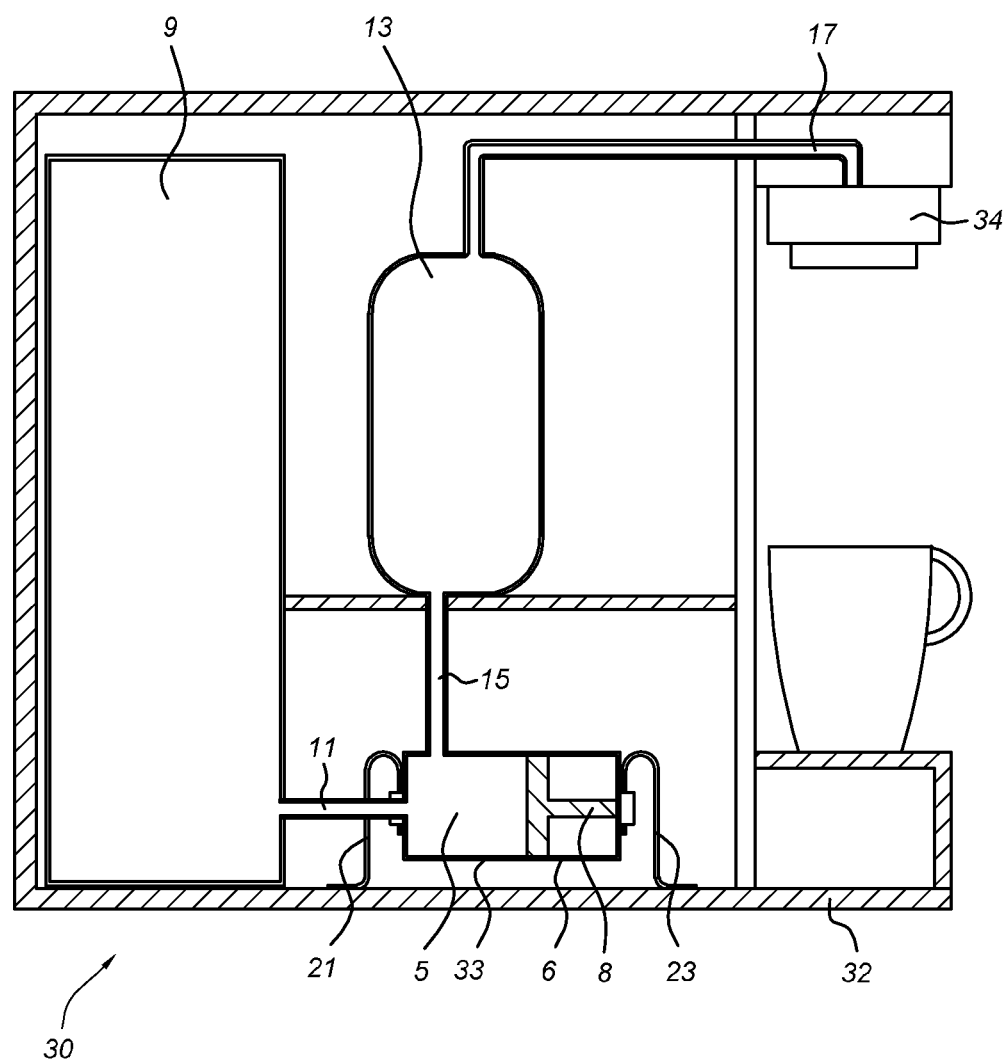
FIG. 3 shows a schematic illustration of a coffee making apparatus according to a second embodiment.

FIG. 3 shows a coffee making apparatus 30 comprising a base frame, for example a housing 32, an actuator, for example, a plunger pump 5, connected to the housing 32 via leaf springs 21,23 mounted at opposite sides of the plunger pump 5.

The plunger pump 5 may comprise an elongated pump house 6 and a plunger 8. The leave springs 21,23 enables the plunger pump 5 to move in horizontal direction opposite to a direction of a movement of the plunger 8 and parallel to a longitudinal axis of the pump house 6. The coffee making apparatus 30 may be provided with a water reservoir 9 mounted in the housing 32, an outlet of the water reservoir 9 is connected to an inlet of the plunger pump 5 via a first flexible tube 11 or corrugated tube. The water reservoir 9 may be detachably mounted at the housing 32 to facilitate easy refilling. Furthermore, the coffee making apparatus 30 comprises a boiler 13 for heating water. An inlet of the boiler 13 is connected to an outlet of the plunger pump 5 via a second flexible tube 15. An outlet of the boiler 13 is connected via a third tube 17 to a coffee pad holder 34 for dispensing hot water.

In operation, the plunger pump is normally reciprocating at the mains frequency of for example 50 or 60 Hz. The leaf springs 21,23 reduce transmission of vibrations from the plunger pump 5 to the housing 32 and reduction of structure born noise.

The leaf springs 21,23 may be of a similar type as the leaf springs described with relation to FIG. 2. The leaf springs can be connected at opposite sides of the pump house along longitudinal direction. Furthermore, dimensioning of the leaf springs 21,23 in this embodiment is explained in the above description of the embodiment relating to FIG. 1.

In the above described embodiments of the steam iron 1 and coffee making apparatus 30 the plunger pump 5 may be replaced by a diaphragm pump. The amount of vibration reduction that can be achieved is about −40 dB in the direction of the movement.

The practical reduction in sound level that can be obtained would be lower and is dependent on the product architecture and the side and/or surface of the base frame. Although illustrative embodiments of the present invention have been described with reference to the accompanying drawings, it is to be understood that the invention is not limited to these embodiments. Various changes or modifications may be effected by one skilled in the art without departing from the scope or the spirit of the invention as defined in the claims. Accordingly, reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that the particular features, structures, or characteristics may be combined in any suitable manner in one or more embodiments.

The invention claimed is:

1. A domestic appliance comprising:

a base frame, an actuator connected to the base frame, the actuator being provided with a drive member, the actuator being arranged for reciprocating movement of the drive member at a reciprocating frequency ($f_r$), wherein the domestic appliance further comprises a first leaf spring and a second leaf spring, the first leaf spring being connected at a first end of the actuator at a first end surface in an axial direction along a direction of a movement of the drive member, the first leaf spring being connected at a second end to the base frame at a first interface, wherein first leaf spring extends perpendicular to the axial direction of the actuator, the second leaf spring being connected at a first end to the actuator at a second end surface of the actuator, opposite said first distal end surface, the second leaf spring being connected at a second end to the base frame at a second interface, whereby the second leaf spring extends perpendicular to the axial direction of the actuator, the first and second leaf springs enabling the actuator to move in a direction opposite to a direction of the movement of the drive member, wherein the end portions of the first and second leaf springs that are connected to the actuator conform to a U-shape, wherein the drive member causes reaction forces of the actuator to act on the first and second leaf springs to deflect the first and second leaf springs in a longitudinal direction opposite the movement of the drive member, in addition to the actuator forces deflecting the first and second leaf springs in the horizontal direction, the reaction forces further cause a residual widening of the opening of the U-shape of the first and second leaf springs from an initial substantially bent shape towards a straight line shape, the actuator, the drive member and the leaf springs together forming a mass spring system having a natural frequency ($f_n$) wherein a stiffness of the leaf springs is adapted so that a ratio between the reciprocating frequency ($f_r$) and the natural frequency ($f_n$) is at least $\sqrt{2}$ but no more than 10, wherein the first and second leaf springs comprise respective first and second attachment surfaces formed in a first lea of the U-shape, wherein the first and second attachment surfaces are attached to the first and second end surfaces of the actuator, respectively, via a first elastomer member positioned directly between the first attachment surface and the first end surface of the actuator, and via a second elastomer member positioned directly between the second attachment surface and the second end surface of the actuator, wherein the base frame comprises a first flexible tube and the first flexible tube comprises a corrugated tube having a flexibility for reducing transmission of vibrations from the actuator to the base frame, wherein dimensions of the leaf springs depend on a mass of the actuator member, the reciprocating frequency ($f_r$), a Young's modulus of a material of the leaf springs and a maximal allowed amplitude of the movement of the actuator in the base frame.

2. The domestic appliance according to claim 1, wherein the leaf springs comprise a bended end portion.

3. The domestic appliance according to claim 1, wherein the domestic appliance further comprises a water reservoir provided at the base frame, the water reservoir being operationally connected to the actuator via the first flexible tube.

4. The domestic appliance according to claim 3 wherein the water reservoir is detachably mounted at the base frame.

5. The domestic appliance according to claim 1 wherein the domestic appliance further comprises a boiler for water heating or steam generation provided at the base frame, the boiler being operationally connected to the actuator via a second flexible tube.

6. The domestic appliance according to claim 1 wherein the actuator comprises a plunger pump.

7. The domestic appliance according to claim 1 wherein the actuator comprises a plunger pump and the drive member comprises the plunger.

* * * * *